United States Patent [19]
Manning

[11] Patent Number: 5,570,258
[45] Date of Patent: Oct. 29, 1996

[54] PHASE MONITOR AND PROTECTION APPARATUS

[75] Inventor: William R. Manning, North Attleboro, Mass.

[73] Assignee: Texas Instruments Incorporated, Dallas, Tex.

[21] Appl. No.: 439,258

[22] Filed: May 11, 1995

[51] Int. Cl.$^6$ ...................................................... H02H 3/26
[52] U.S. Cl. .................................................. 361/85; 361/76
[58] Field of Search ........................... 361/29, 30, 76–79, 361/85, 88, 89; 324/76.52, 521, 524

[56] References Cited

U.S. PATENT DOCUMENTS

| | | | |
|---|---|---|---|
| 4,023,075 | 5/1977 | Reuter | 361/76 |
| 4,199,798 | 4/1980 | Leppke et al. | 361/76 |

OTHER PUBLICATIONS

Copending, Coassigned U.S. Patent Application Serial No. 08/176,754 filed Jan. 3, 1994 Inventor(s): William R. Manning et al. Title: Phase Sequence Wiring Protection Apparatus.

*Primary Examiner*—Jeffrey A. Gaffin
*Assistant Examiner*—Ronald W. Leja
*Attorney, Agent, or Firm*—Russell E. Baumann; Richard L. Donaldson; René E. Grossmann

[57] ABSTRACT

A phase monitor and protection circuit is shown in which an impedance network (21, 23, 25) in a respective branch (20, 22, 24) connected to a neutral (26) is coupled to each phase of a three phase power supply (L1, L2, L3) to create a known voltage profile across the respective networks. A relay network (36) is coupled to one branch (20) and a control network (30) is coupled to a second branch (24) to monitor the voltage levels and deenergize the relay (R1) upon the occurrence of the reversal of any two phases or the loss of a phase. The control circuit can also be used to detect low voltage conditions and in a second embodiment provides a time delay network (44) to avoid nuisance tripping due to transient low voltage or brown out condition.

12 Claims, 3 Drawing Sheets

5,570,258

1

PHASE MONITOR AND PROTECTION APPARATUS

FIELD OF THE INVENTION

This invention relates generally to polyphase power supplies and more particularly to apparatus for preventing damage to loads caused by incorrectly reversing phases in wiring such loads to a polyphase power supply or by losing a phase during operation of such loads.

Certain equipment, such as scroll compressors, are designed to rotate in a given direction and can be severely damaged if caused to rotate in the reverse direction. In the case of a scroll compressor even short term rotation in the reverse direction will permanently damage the scroll plate. It is typical to use three phase motors to drive such compressors and, if the motor phase sequence is miswired, reverse rotation will result. That is, with respect to a three phase motor having windings A, B and C spaced 120° apart, if these windings are coupled to phases A' (L1), C' (L3), B' (L2) respectively of a three phase power supply, the motor will run in a direction reverse to that intended.

It is therefore important that the wiring sequence be verified prior to energization of such a compressor system. In copending, coassigned U.S. patent application Ser. No. 08/176,754 filed Jan. 3, 1994, a phase sequence wiring protection apparatus is disclosed and claimed in which first and second resistors each having the same first impedance level and a capacitor having an equivalent impedance are connected in a wye configuration and an analog comparator network is coupled in line with the first resistor to monitor the voltage differential which occurs when the phases are in and out of sequence. The output of the comparator network is coupled to the base of a transistor which serves as a switch to provide a signal to control circuitry to prevent energization of the load when the phases are out sequence. Although a phase sequence wiring protection apparatus made in accordance the teachings of the referenced application is effective in providing protection against incorrect phase sequencing, it would also be desirable to provide more complete phase monitoring, e.g., to provide a control responsive to the loss of a phase as well as to the reversal of phases, and if desired, responsive to the occurrence of a low voltage condition.

SUMMARY OF THE INVENTION

It is therefore an object of the invention to provide an improved phase monitoring control responsive to miswired phases of a polyphase power system which is also responsive to other abnormal conditions. Another object of the invention is the provision of control apparatus adapted for use with a polyphase power supply which is responsive to a phase loss as well as to phase reversals. Yet another object is the provision of such apparatus which also is responsive to low voltage conditions. Still another object of the invention is the provision of a cost effective, stand alone monitoring apparatus which will deenergize a load upon the occurrence of improper phase sequencing or phase loss and, if desired, selected low voltage conditions.

Briefly, in accordance with the invention, a phase monitoring device comprises an impedance network arranged to be coupled to each phase of a three phase power supply and in turn connected in common or neutral in a wye configuration to provide a predetermined voltage profile established across each network due to phasor displacement. A relay network is coupled to one phase and a control logic network

2 is connected to a second phase and arranged to control the on/off function of a relay control switch. The relay control switch contacts are wired in series with a contactor coil as a pilot duty control. In a proper wiring sequence (L1, L2, L3), the voltage across the impedance network coupled to L1, in accordance with the invention, is substantially lower than the voltage across the networks coupled to L2 and L3. If any two voltages are reversed, the voltage magnitude across the impedance network at L3 is reduced and across the impedance network at L1 is increased. The control logic network is wired in series with the impedance network coupled to L3 to detect this change in voltage. If the phase sequence is wired properly the control logic network will close a relay control switch allowing energization of the contactor coil. If the phase sequence is reversed (L2, L1, L3), a voltage decrease across the impedance network coupled to L3 is detected and the contactor is prevented from being energized. Upon loss of phase condition, the relay control switch will open circuit and deenergize the contactor coil. If desired, an external warning indicator can be provided to signal if a phase sequence problem or phase loss condition has occurred. According to a modified embodiment of the invention, a selected low voltage condition can be sensed by the circuit and after a suitable time delay the relay control switch will open circuit and deenergize the contactor coil.

BRIEF DESCRIPTION OF THE DRAWINGS

Other objects, advantages and details of the novel and improved phase monitor and protection apparatus of the invention appear in the following detailed description of the preferred embodiments, the detailed description referring to the drawings in which.

DETAILED DESCRIPTION OF PREFERRED EMBODIMENTS

Figure 1:
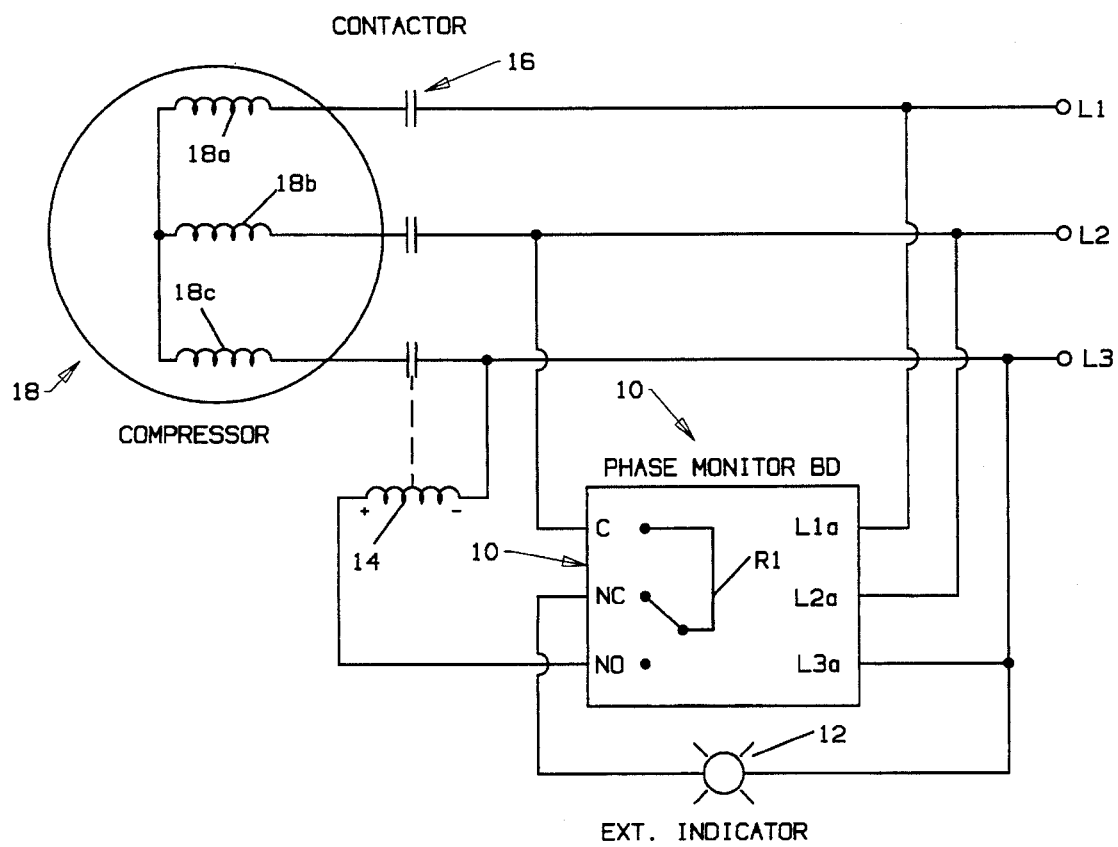
FIG. 1 is a schematic diagram of a phase monitor and protector device made in accordance with the invention used as a pilot duty control coupled to three phases of a power supply connected to a compressor through a conventional contactor.

With reference to FIG. 1, a phase monitor and protector device 10 made in accordance with the invention has phase connection terminals L1a, L2a and L3a connected respectively to lines L1, L2 and L3 of a three phase power supply. Relay R1 of phase monitor and protector device 10 has an output terminal C coupled to line L2, a normally closed terminal NC connected to line L3 through an indicator lamp 12 and a normally open terminal NO coupled to coil 14 in turn connected to line L3. Coil 14 controls the state of energization of contactor 16 in lines L1, L2 and L3. Compressor 18, having windings 18a, 18b and 18c, is connected in a wye configuration to respective lines L1, L2 and L3 through contactor 16. As will be discussed below, closing of normally open terminal NO of relay R1 will energize coil 14 of contactor 16 to energize compressor 18 and conversely, opening terminal NO will result in deenergization of the contactor. Indicator lamp 12 is arranged so that it is energized when the contactor coil is deenergized.

Figure 2:
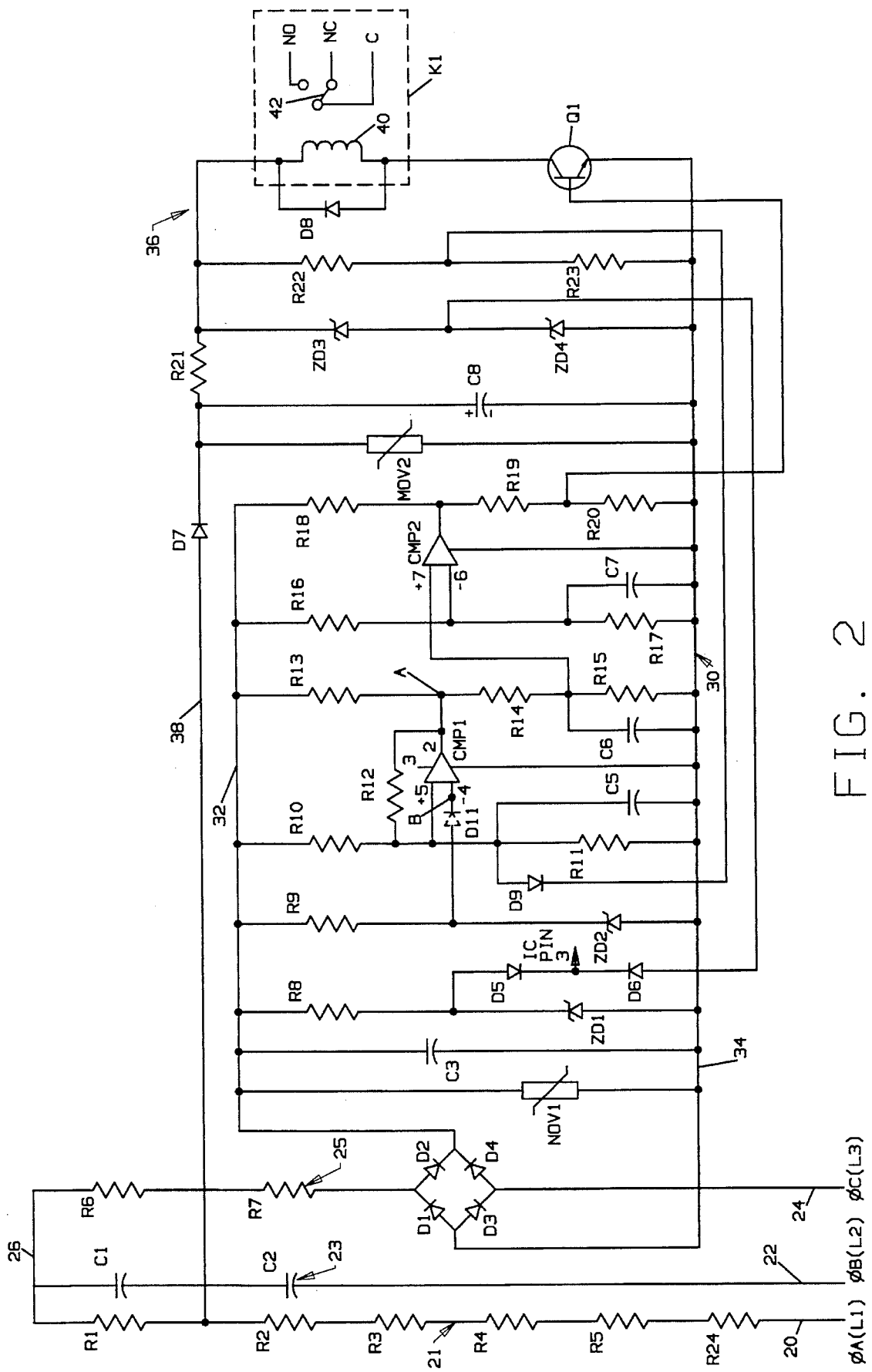
FIG. 2 is a schematic circuit diagram of the phase monitor and protector device shown in FIG. 1.
Figure 2A:
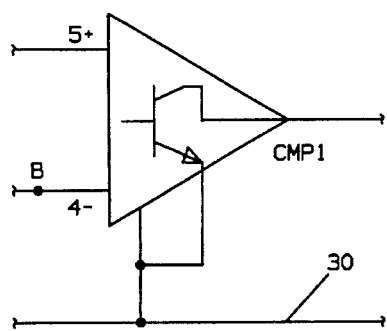
FIG. 2A is an enlarged portion of the FIG. 2 circuit diagram, including comparator CMP1, showing an output transistor of the comparator.

With reference to FIG. 2, a schematic circuit diagram of a monitor and protector device particularly adapted for a 460 VAC application is shown. A high impedance network is placed in each branch 20, 22 and 24 adapted to be connected to supply lines L1, L2 and L3 respectively. Branch 20 comprises serially connected resistors R24, R5, R4, R3 and R2 all of 3.5K ohms in turn connected to neutral or common point 26 through resistor R1 of 180K ohms. Branch 22 comprises serially connected capacitors C1 and C2 each of 0.1 uf connected to neutral 26. Serially connected resistors R6 and R7 of 30K ohms each comprise branch also connected to neutral 26.

A full wave rectifier comprising diodes D1, D2, D3 and D4 is connected to branch 24 to provide a DC source to control logic network 30. Varistor MOV1 connected between rail 32 and common 34 provides surge protection and capacitor C3 connected between rail 32 and common filters the DC ripple. Resistors R8 and a 33 volt zener diode ZD1 connected between rail 32 and common provide a selected voltage for excitation of first and second comparators CMP1 and CMP2 which, in a device built in accordance with the invention comprised two sections of a quadcomparator. It is, however within the scope of the invention to employ discrete comparators, if desired. The junction of zener diode ZD1 and resistor R8 is connected to power input pin 3 of comparator CMP1 through a diode D5. The cathode of diode D5 is also connected to the cathode of diode D6 of relay network 36 to be discussed below. Resistor R9 and a 12 volt zener diode ZD2 connected between rail 32 and common 34 establish a reference voltage at their interconnection which is connected to the inverting input pin 4 of comparator CMP1. Resistors R10 and R11 connected across rail 32 to common 34 comprise a voltage divider network whose interconnection is connected to the non-inverting input pin 5 of comparator CMP1. Capacitor C5 serves as a high frequency noise filter. Feedback resistor R12 is connected between output pin 2 of comparator CMP1 and the non-inverting input pin 5.

Output pin 2 of comparator CMP1 is connected to a point between serially connected resistors R13 and R14 which form a voltage divider with resistor R15 connected across rail 32 to common 34. The junction between resistors R14 and R15 is connected to the non-inverting input pin 7 of comparator CMP2 while the inverting input pin 6 is connected to the voltage divider junction of a voltage divider comprising resistors R16 and R17 across rail 32 and common 34. Capacitors C6 and C7 coupled around resistors R15, R17 respectively, serve as high frequency noise filters. The output of comparator CMP2 is connected to the junction of resistors R18 and R19 which are in turn serially connected to resistor R20 between rail 32 and common. The junction of resistors R19 and R20 is connected to the base of NPN transistor Q1 which is a part of a relay network 36 to be discussed below.

Relay network 36 comprises a current limiting resistor R21 serially connected to a half-wave rectifying diode D7 connected to branch 20 intermediate resistors R1 and R2. Varistor MOV2 connected across relay network rail 38 and common 34 provides surge protection while capacitor C8 filters the DC signal. Zener diodes ZD3, a 16 volt device connected to rail 38 and serially connected ZD4, a 33 volt device, establish a rail voltage of approximately 49 volts. The junction of zener diode ZD3 and ZD4 is connected to power input pin 3 of comparator CMP1 through diode D6. As noted above, the common point between the cathodes of D6, D5 is connected to pin 3 of comparator CMP1.

The junction of a voltage divider comprising R22 and R23 connected across rail 38 and common is connected to the cathode of diode D9 with its anode connected to the junction of voltage divider of resistors R10, R11 for a purpose to be discussed below.

Coil 40 of relay K1 is connected to rail 38 and the collector of NPN transistor Q1 whose emitter is connected to common. A diode D8 is connected across coil 40 to eliminate back EMF. Relay K1 has a movable contact arm 42 which is normally in engagement with a contact of normally closed terminal NC and is movable into engagement with a contact of normally open terminal NO when coil 40 is energized.

Figure 3:
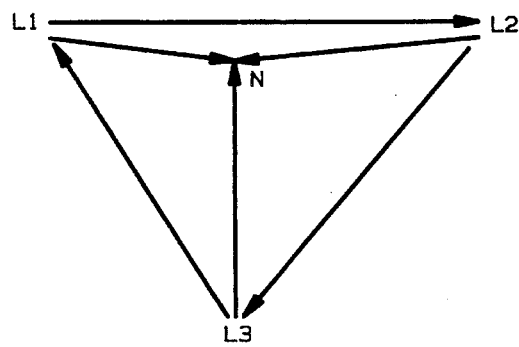
FIGS. 3 and 4 are vector diagrams respectively showing voltage vectors between the several line phases and neutral representing voltage magnitude across the impedance networks in a normal operating mode and in a mode in which two phases are reversed.
Figure 4:
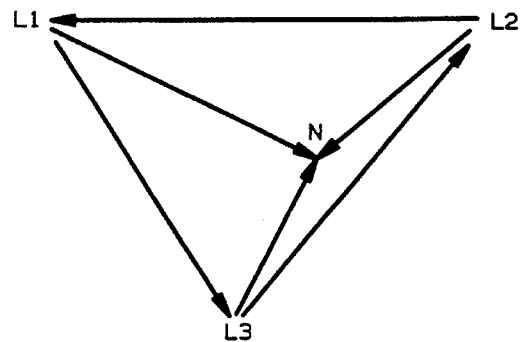

Under normal conditions, due to the negative 90° phase angle characteristic of the impedance network 23 in branch 22 (L2) used with a conventional three phase system 120° apart, as seen in FIG. 3, in a proper wiring sequence (L1-L2-L3) the voltage across the impedance network coupled to L1 ($V_{L1-N}$) is substantially lower than the voltage across the networks coupled to L2($V_{L2-N}$) and L3($V_{L3-N}$). In a 460–480 volt system the voltage across L3 and neutral is approximately 580 volts, L2 and neutral approximately 460–480 and L1 and neutral approximately 270–300 VAC. If any two phases are reversed the voltage magnitude of $V_{L3-N}$ across network 25 is reduced and $V_{L1-N}$ across network 21 is increased as shown in FIG. 4.

As shown in FIG. 2, control network 30 is wired in series with the impedance network 25 in branch 24 to detect a change in voltage magnitude. This is accomplished by establishing a fixed reference voltage to the inverting input (pin 4) of comparator CMP1 and allowing the non-inverting input of comparator CMP1 to float with the voltage of rail 32 which fluctuates in accordance with changes in the voltage across impedance network 25, $V_{L3-N}$. When the inverting input voltage is less than the non-inverting voltage of comparator CMP1, transistor Q1, through comparator CMP2 to be discussed below, is excited allowing the normally open contact in terminal NO to be closed. When the inverting input is greater than the non-inverting input voltage the relay is prevented from being energized thereby providing an indication of an adverse line voltage condition. Comparator CMP2 is employed as a buffer network to provide suitable switching hysteresis.

The power supply lines L1, L2 and L3 are coupled to high impedances in order to minimize the current draw from the motor. The impedance network 21 in branch 20 (L1) is selected at a lower level than the impedance network 25 of branch 24 (L3) in order to provide a suitable relay network rail voltage 38 of approximately 48 VDC to provide the approximately 7.5 milliamps required to drive relay K1. As stated above, under normal operating conditions, the voltage across line L1 to neutral is substantially less than across L2 to neutral or L3 to neutral, i.e., in the 460 VAC application approximately 270 VAC. The control logic network 30, on the other hand, is coupled to branch 24 (L3), the highest voltage drop—approximately 550 VAC but using sufficiently high impedance so that current draw is only a few milliamps, just enough to drive the control network.

Under normal operating conditions, control network rail voltage 32 is on the order of 50–60 VDC providing a voltage of approximately 15 volts at pin 5 of comparator CMP1.

Since the voltage at the inverting pin 4 is 12 volts due to zener diode ZD2, the output transistor at pin 2 will be off and therefore the voltage at the non-inverting pin 7 of comparator CMP2 will be higher than the voltage at the inverting pin 6 and the output transistor of comparator CMP2 will be off. As a result, bias current will flow from rail 32 through resistors R18 and R19 to the base of transistor Q1 turning it on.

If any two phases are reversed, for example, lines L1 and L3 are reversed at the main panel to a power system or to a main transformer or the like, the voltage across line L3 to neutral is decreased. The rail voltage 32 at the control logic network 30 is also decreased to approximately 30 volts so that the voltage at pin 5 drops below the reference voltage of 12 volts at pin 4 so that the output transistor of comparator CMP1 is biased on. This results in pulling the voltage at pin 7 of comparator CMP2 below that of inverting pin 6 with the output transistor of comparator CMP2 being turned on and the common connection of resistors R18 and R19 along with the base of transistor Q1 being pulled to analog ground and preventing energization of relay K1.

By connecting relay network 36 and control logic network 30 to different nodes of the circuit any phase loss condition can be detected. With loss of phase L3 the rail voltage 32 will decrease to essentially zero thereby removing bias current to transistor Q1 and deenergizing relay K1. With the loss of phase L2, with capacitors C1 and C2 out of the network the voltage between L3 and neutral will drop from 580 volts to approximately 180 volts. This results in decreasing the rail voltage from 50–60 volts down to approximately 30 volts which result in the voltage at pin 5 decreasing below the reference voltage of pin 4 of comparator CMP1 thereby turning off transistor Q1 and relay K1. With the loss of phase L1 there is insufficient current to drive relay K1 so that it is deenergized. Resistors R1 serves to limit current flow from line L2. Further, due to the voltage divider network of resistors R22 and R23 the voltage at pin 5 of comparator CMP1 will be pulled lower than that of pin 4 causing the base current of transistor Q1 to be shunted to ground. Even through a current path exists from line L2 through resistor R1 its resistance level is sufficiently high so that current is limited to one or two milliamps compared to the 7.5 milliamps needed to drive the relay. Since the rail voltage 32 drops from 48 volts down to 20–25 volts, diode D9 becomes forward biased placing diode D9 and resistor R23 in parallel with resistor R11 to further decrease the voltage at pin 5.

The interconnection between zener diodes ZD3 and ZD4 with diodes D6 and D5 ensures that comparators CMP1, CMP2 have sufficient current and voltage to function as intended, even with loss of phase L3. Under normal operating conditions, the voltage at the cathodes, the common point of diodes D6 and D5 is greater than the voltage at the cathode of zener diode ZD4 or the cathode of zener diode ZD1. The voltage of zener diode ZD1 is higher than that of zener diode ZD4 so that diode D6 is reversed biased allowing current flow from zener diode ZD1 through diode D9 to pin 3 of comparator CMP1 which serves as its power input. In the event that phase L3 is lost the voltage at the cathode and anode of zener diode ZD1 is essentially zero so that the voltage at the cathode of diode D6 is greater than that at the anode of diode D5 causing the diode D5 to be reversed biased. This allows current to flow from zener diode ZD4 through diode D6 to pin 3. As a result, voltage at the comparator input is assured thereby avoiding potential erratic behavior. If phase L1 is lost the reverse situation occurs. That is, zener diode ZD1 and diode D5 will have a higher voltage potential combination than diode D6 and zener diode ZD4 with diode D6 reversed biased.

A monitor and protector device made in accordance with the invention for a 460 volt power supply has the following components:

TABLE

| | | | |
|---|---|---|---|
| R1 | 180K ohms 3w | C1 | .1 uf 250 V |
| R2 | 3.6K ohms 3w | C2 | .1 uf 250 V |
| R3 | 3.6K ohms 3w | C3 | 47 uf 100 V |
| R4 | 3.6K ohms 3w | C5 | .01 uf |
| R5 | 3.6K ohms 3w | C6 | .01 uf |
| R6 | 30K ohms 3w | C7 | .01 uf |
| R7 | 30K ohms 3w | C8 | 47 uf 100 V |
| R8 | 10K ohms | MOV1 | 150NR-12D (STETRON) |
| R9 | 100K ohms | MOV2 | 150NR-12D (STETRON) |
| R10 | 464K ohms | | |
| R11 | 140K ohms | | K1 GR2-14-H 48 VDC (OMRON) |
| R12 | 649K ohms | | Q1 NPN MPS8099 (MOTOROLA) |
| R13 | 200K ohms | | COMP 1, 2 LM2901 QUADCOMPARATOR |
| R14 | 50K ohms | | |
| R15 | 100K ohms | ZD1 | 33v |
| R16 | 130K ohms | ZD2 | 12v |
| R17 | 30K ohms | ZD3 | 16v |
| R18 | 100K ohms | ZD4 | 33v |
| R19 | 37K ohms | | |
| R20 | 24K ohms | | D1–D9 1N4007 |
| R21 | 490 ohms 1/2W | | |
| R22 | 10.5K ohms | | |
| R23 | 11.5K ohms | | |
| R24 | 3.6K ohms 3w | | |

According to a feature of the invention by utilizing a floating rail voltage, the monitor and protector device can also be used to detect a low voltage condition. For example, if line voltage should drop from 460 volts to 370 volts, the voltage drop between phase L1, L2, L3 respectively and neutral will similarly decrease. Zener diode ZD2 still provides a fixed reference voltage at pin 4 of comparator CMP1 so that a decrease of voltage at pin 5 due to a decrease voltage at rail 32 will cause the output transistor 2 of comparator CMP1 to turn on and remove bias current from transistor Q1 in the same manner as described above in relation to a reversal of phases. When used for detecting a low voltage condition, a suitable time delay can be provided either separately or as part of the monitor circuit as will be described below to avoid nuisance tripping due to transitory low voltage conditions. The monitor and protector device built in accordance with Table A will actuate if the voltage decreases to approximately 310 volts for an inherent response time of approximately 0.5 seconds. The particular voltage level at which the monitor and protector device actuates can be adjusted by using appropriate resistor values. Further, any desired time delay can be provided.

Figure 5:
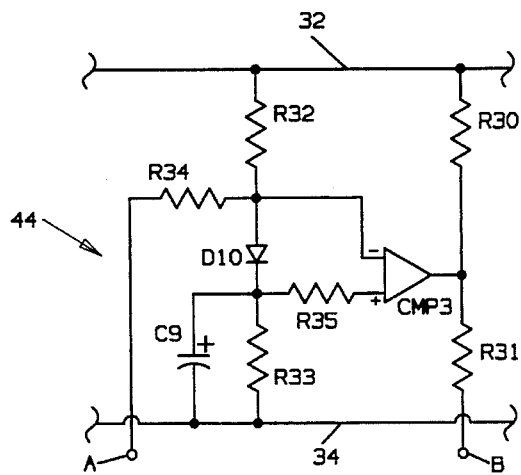
FIG. 5 is a schematic wiring diagram of a modified embodiment of the invention.

As mentioned above, suitable time delay can be provided either separately or as part of the monitor circuit. An example of one such time delay which would be a suitable for inclusion in the monitor circuit is shown in FIG. 5. Time delay network 44 comprises a comparator CMP3 whose non-inverting input is connected through resistor R35 to a point between resistor R33 connected to common and the cathode of diode D10. The anode of diode D10 is connected to the junction of resistors R32 and R34. Resistor R32 is connected to the supply rail 32 while resistor R34 leads to point A. The inverting input of comparator CMP3 is connected to the junction of resistors R32 and R34. The output of the comparator is connected to the junction of resistors R30, R31 which are connected between supply rail 32 and point B. An RC network comprising comparator C9 coupled around resistor R33 provides the selected time delay. Resistor R35 prevents discharge current from capacitor C9 from going back into the non-inverting input.

With reference to FIG. 2, point B is connected to the inverting input (pin 4) of comparator CMP1 between the cathode of a diode D11 (shown in dashed lines) connected to pin 4 when the time delay network 44 is employed. Point A is connected to the output of comparator CMP1.

Upon a low voltage condition of a sufficient level, the non-inverting voltage input of comparator CMP1 is brought lower than the inverting input bringing point A to ground by turning on the output transistor of comparator CMP1. That causes resistor R34 to be pulled to ground causing the voltage at the inverting input of comparator CMP3 to be lower than the non-inverting input so the output of the comparator is high maintaining inverting input pin 4 higher than non-inverting pin 5. Diode D10 is reversed biased preventing any charging current to capacitor C9 and capacitor C9 begins to discharge through resistor R33 to start the time delay sequence with pin 4 being maintained above the non-inverting input pin 5 until capacitor C9 is discharged when the voltage in the cathode of diode D10 becomes less than the voltage at its anode. Thus, the action of comparator CMP3 inhibits the normal action of comparator CMP1 for the selected time delay. When the time delay network 44 is used with the monitor circuit of FIG. 2, the value of resistor R9 may be changed appropriately in view of resistor R31 tied to point B. A time delay network as shown in FIG. 5 is also shown in copending application Ser. No. 08/176,754 mentioned supra, to which reference may be had for further details.

While this invention has been explained with reference to the structure disclosed herein, it is not confined to the details set forth. For example, it will be appreciated that although a relay is described in the preferred embodiments other switching means could be employed, such as a power semiconductor. Further, although compressor 18 is shown with wye connected windings, the monitor and protector apparatus made in accordance with the invention can also be used with delta connected windings. It is intended that any changes and modifications be covered as may come within the scope of the appended claims.

What is claimed:

1. Phase monitor and protection circuit apparatus for use with a three phase AC power supply as a pilot duty control having a relay with contacts to be wired in series with a contactor coil comprising first, second and third unbalanced networks connected in a wye configuration, each impedance network being coupled to a phase connection terminal for connection to respective power source lines, the first and third impedance networks comprising resistive networks and the second impedance network comprising a capacitive network to establish a selected voltage profile across the impedance networks, a relay network coupled to the first impedance network comprising a diode to rectify AC current conducted through the first impedance network to provide a relay voltage source rail for the relay network, first zener diode means coupled to the rail to provide a selected voltage level for driving a relay, a relay coil and a solid state switch means serially connected with the relay coil coupled to the rail, a control logic network serially connected to the third impedance network comprising a full wave bridge rectifier to provide a control voltage source rail and common, the voltage level of the control voltage source rail being dependent upon the voltage level of the respective power source line to which the third impedance network is connected, a comparator having an inverting and a non-inverting input and an output transistor, second zener diode means coupled to the control voltage source rail to provide a fixed reference voltage, the reference voltage coupled to the inverting input, a voltage divider comprising first and second voltage divider resistors connected between the control voltage source rail and common, a junction formed between the first and second voltage divider resistors, the junction coupled to the non-inverting input, the output transistor of the comparator and the control voltage source rail being coupled to the solid state switch means of the relay network, the reference voltage at the inverting input being less than the voltage at the non-inverting input when the impedance networks are coupled to the respective power source lines with the phases in sequence and with all the phases energized and with the phases above a preselected minimum voltage level thereby keeping the comparator output transistor off and allowing current to flow from the control voltage source rail to the solid state switch means to excite the solid state switch means and energize the relay coil, the voltage at the inverting input being greater than the voltage at the non-inverting input when the impedance networks are coupled to the respective power source lines with the phases out of sequence thereby turning the transistor output on and shunting current away from the solid state switch means to thereby deenergize the solid state switch means and the relay coil.

2. Phase monitor and protection apparatus according to claim 1 including a current limiting resistor serially connected between the first impedance network and the wye connection.

3. Phase monitor and protection apparatus according to claim 2 including a time delay means coupled to the comparator so that when the voltage at the reference inverting input exceeds the voltage at the non-inverting input the transistor output is prevented form turning on for a selected time interval.

4. Phase monitor and protection apparatus according to claim 1 including a second comparator coupled between the transistor output and the solid state switch means to serve as a buffer and increase the switching hysteresis of the solid state switch means.

5. Phase monitor and protection circuit apparatus for use with a three phase AC power supply as a pilot duty control having a relay with contacts to be wired in series with a contactor coil comprising first, second and third unbalanced impedance networks connected in a wye configuration, each impedance network being coupled to a phase connection terminal for connection to respective power source lines, the first and third impedance networks comprising resistive networks and the second impedance network comprising a capacitive network to establish a selected voltage profile across the impedance networks, a relay network coupled to the first impedance network comprising a diode to rectify AC current conducted through the first impedance network to provide a relay voltage source rail for the relay network, first zener diode means coupled to the rail to provide a selected voltage level for driving a relay, a relay coil and a solid state switch means serially connected with the relay coil coupled to the rail, a control logic network coupled to the third impedance network comprising a full wave bridge rectifier to provide a control voltage source rail and common, the voltage level of the control voltage source rail being dependent upon the voltage level of the respective power source line to which the third impedance network is connected, a comparator having an inverting and a non-inverting input and an output transistor, second zener diode means coupled to the control voltage source rail to provide a fixed reference voltage, the reference voltage coupled to the inverting input, a voltage divider comprising first and second voltage divider resistors connected between the control voltage source rail and common, a junction formed between the first and second voltage divider resistors, the junction coupled to the non-inverting input, the output transistor of the comparator and the control voltage source rail being coupled to the solid state switch means of the relay network, the comparator having a power input pin and further including a third zener diode means including a second diode connected to the control voltage source rail to establish a selected comparator excitation voltage level at the anode of the second diode, the first zener diode means including a third diode connected to the relay voltage source rail to establish a selected comparator excitation level at the anode of the third diode, the cathodes of the second and third diodes connected to each other and to the power input pin of the comparator, the reference voltage at the inverting input being less than the voltage at the non-inverting input when the impedance networks are coupled to the respective power source lines with the phases in sequence and with all the phases energized and with the phases above a preselected minimum voltage level thereby keeping the comparator output transistor off and current to flow from the voltage source rail to the solid state switch means to excite the solid state switch means and energize the relay coil, the voltage at the inverting input being greater than the voltage at the non-inverting input when the impedance networks are coupled to the respective power source lines with the phases out of sequence thereby turning the transistor output on and shunting current away from the solid state switch means to thereby deenergize the solid state switch means and the relay coil.

6. Phase monitor and protection apparatus for use with a three phase AC power supply comprising first, second and third impedance networks connected in a wye configuration, each impedance network being coupled to a phase connection terminal for connection to respective power source lines, the first and third impedance networks comprising resistive networks and a second impedance network comprising a capacitive network to establish a selected voltage profile across the impedance networks, a first circuit network coupled to the first impedance network comprising a diode to rectify the AC current conducted through the first impedance network to provide a first voltage rail, first zener diode means coupled to the first rail to provide a selected voltage level, a solid state switch means coupled to the rail, a second circuit network serially connected to the third impedance network comprising a full wave bridge rectifier to provide a second voltage rail and common, the second voltage rail dependent upon the voltage level of the respective power source line to which the third impedance network is connected, a comparator having an inverting and a non-inverting input and an output transistor, second zener diode means coupled to the second voltage rail to provide a fixed reference voltage, the reference voltage coupled to the inverting input, a voltage divider comprising first and second voltage divider resistors connected between the second voltage rail and common, a junction formed between the first and second voltage divider resistors, the junction coupled to the non-inverting input, the output transistor of the comparator and the second voltage rail being coupled to the solid state switch means, the reference voltage at the inverting input being less than the voltage at the non-inverting input when the impedance networks are coupled to the respective power source lines with the phases in sequence and with all the phases energized and above a low limit voltage level thereby keeping the comparator output transistor off and allowing the current to flow from the second voltage rail to the solid state switch means to excite the solid state switch means, the reference voltage at the inverting input being greater than the voltage at the non-inverting input when the impedance networks are coupled to the respective power source lines with the phases out of sequence or when the voltage level of the power source falls below the low limit level for a selected period of time thereby turning the comparator output transistor on and shunting current away from the solid state switching means to thereby turning off the solid state switch means.

7. Phase monitor and protection apparatus according to claim 6 including a current limiting resistor serially connected between the first impedance network and the wye connection.

8. Phase monitor and protection apparatus according to claim 6 including time delay means coupled to the comparator so that when the voltage at the inverting input exceeds the voltage at the non-inverting input the transistor output is prevented from turning on for a selected time interval.

9. Phase monitor and protection apparatus according to claim 6 including a second comparator coupled between the transistor output and the solid state switch to serve as a buffer and a increase the switching hysteresis of the solid state switch.

10. Phase monitor and protection apparatus for use with a three phase AC power supply comprising first, second and third impedance networks connected in a wye configuration, each impedance network being coupled to a phase connection terminal for connection to respective power source lines, the first and third impedance networks comprising resistive networks and a second impedance network comprising a capacitive network to establish a selected voltage profile across the impedance networks, a first circuit coupled to the first impedance network comprising a diode to rectify the AC current conducted through the first impedance network to provide a first voltage rail, first zener diode means coupled to the first rail to provide a selected voltage level, a solid state switch means coupled to the rail, a second circuit network coupled to the third impedance network comprising a full wave bridge rectifier to provide a second voltage rail and common, the second voltage rail dependent upon the voltage level of the respective power source line to which the third impedance network is connected, a comparator having an inverting and a non-inverting input and an output transistor, second zener diode means coupled to the second voltage rail to provide a fixed reference voltage, the reference voltage coupled to the inverting input, a voltage divider comprising first and second voltage divider resistors connected between the second voltage rail and common, a junction formed between the first and second voltage divider resistors, the junction coupled to the non-inverting input, the output transistor of the comparator and the second voltage rail being coupled to the solid state switch means, the comparator having a power input pin and further including a third zener diode means including a second diode connected to the second voltage rail to establish a selected comparator excitation voltage level at the anode of the second diode, the first zener diode means including a third diode connected to the first voltage rail to establish a selected comparator excitation level at the anode of the third diode, the cathodes of the second and third diodes connected to each other and to the power input pin of the comparator, the reference voltage at the inverting input being less than the voltage at the non-inverting input when the impedance networks are coupled to the respective power source lines with the phases in sequence and with all the phases energized and above a low limit voltage level thereby keeping the comparator output transistor off and allowing the current to flow from the second voltage rail to the solid state switch means to excite the solid state switch means, the reference voltage at the inverting input being greater than the voltage at the non-inverting input when the impedance networks are coupled to the respective power source lines with the phases out of sequence or when the voltage level of the power source falls below the low limit level for a selected period of time thereby turning the comparator output transistor on and shunting current away from the solid state switching means to thereby turn off the solid state switch means.

11. Phase monitor protection apparatus for controlling the state of energization of a load through a multiphase power source having first, second and third phases comprising first, second and third impedance networks each having a first end connected to a phase connection terminal and a second end connected to each other at a neutral, the first and third impedance networks comprising resistive networks and the second impedance network comprising a capacitive network to establish a selected voltage profile across the impedance networks, a relay network coupled to the first impedance network between the first impedance network and neutral, the relay network having a first voltage rail and a solid state switch with a control electrode to control the state of excitation of the relay, and a control network having a second voltage rail and a comparator responsive to the voltage level across the impedance networks coupled to the third impedance network, the comparator having a power input pin and further including zener diode means including a diode connected to the second voltage rail to establish a selected comparator excitation voltage level at the anode of the diode, another zener diode means including another diode connected to the first voltage rail to establish a selected comparator excitation level at the anode of the said another diode, the cathodes of the said diode and said another diode connected to each other and to the power input pin of the comparator, the control network interconnected with the control electrode so that a change in the voltage profile caused by reversal of the connection of any two phases to the load will change the excitation state of the solid state switch and the relay.

12. Phase monitor and protection circuit apparatus according to claim 11 including a circuit limiting resistor serially connected between the first impedance network and neutral.

* * * * *